United States Patent [19]

Saar et al.

[11] Patent Number: 4,489,267
[45] Date of Patent: Dec. 18, 1984

[54] WAVEFORM SYNTHESIZER AND MOTOR CONTROLLER

[75] Inventors: David A. Saar, Timonium; Pradeep M. Bhagwat, Baltimore, both of Md.

[73] Assignee: Black & Decker Inc., Newark, Del.

[21] Appl. No.: 452,834

[22] Filed: Dec. 29, 1982

Related U.S. Application Data

[63] Continuation-in-part of Ser. No. 348,319, Feb. 12, 1982, Pat. No. 4,447,786.

[51] Int. Cl.³ ............................................. H02P 5/40
[52] U.S. Cl. .................................... 318/811; 318/807
[58] Field of Search ............... 318/811, 803, 807–810; 363/41–43

[56] References Cited

U.S. PATENT DOCUMENTS

| | | |
|---|---|---|
| 3,324,376 | 6/1967 | Hunt . |
| 3,538,420 | 11/1970 | Klein . |
| 3,820,003 | 6/1974 | Tappeiner et al. . |
| 4,099,109 | 7/1978 | Abbondanti ......................... 318/811 |
| 4,201,936 | 5/1980 | Roumanis ............................ 318/341 |
| 4,216,417 | 8/1980 | Anderson et al. ................... 318/341 |
| 4,282,465 | 8/1981 | Acker et al. ......................... 318/341 |
| 4,290,108 | 9/1981 | Woehrle et al. ..................... 318/811 |
| 4,337,429 | 6/1982 | Stuart ................................... 318/811 |
| 4,348,734 | 9/1982 | Dougherty ............................ 363/41 |
| 4,387,421 | 6/1983 | Zach et al. ........................... 318/811 |
| 4,409,534 | 10/1983 | Bose ..................................... 318/811 |

OTHER PUBLICATIONS

Sen et al., "Induction Motor Drives with Microcomputer Control System", Conference: IAS Annual Meeting, 1980, Cincinnati, OH. Sep. 28–Oct. 3, 1980, pp. 653–662.
Buja, "A Microcomputer–Based Quasi–Continous Output Controller for PWM Inverters", IEEE Industrial Electronics and Control Instrument" '80 Conference, Mar. 17–20, 1980.
Mazur, T., "A ROM–Digital Approach to PWM–Type Speed Control of AC Motors", 9/75, pp. 1–11.

*Primary Examiner*—David Smith, Jr.
*Attorney, Agent, or Firm*—Ronald B. Sherer; Harold Weinstein; Edward D. Murphy

[57] ABSTRACT

A waveform synthesizer for generating single or polyphase waveforms of selected wave shape and frequency for driving AC machinery including, for example, single or poly-phase induction, synchronous or other type motors or the like, includes a plurality of controllable power-switching device pairs for selectively switching power from an oppositely poled DC source to the corresponding power utilizing circuits of the driven device. The switching device pairs are controlled to provide switched pulses of selected widths, spacings, and repetition rates to generate the desired current waveform. The power-switching device pairs are selectively switched by a control circuit that includes a microprocessor-controlled memory that is divided into P addressable pages with each page including S sequentially accessible memory locations containing the switching device pairs control information necessary to synthesize the desired waveform. The microprocessor is adapted to select one of the P available pages in response to prestored instructions, user input information, or condition-responsive transducer or similar information and, after selecting the desired page P, to control a presettable address counter to sequentially access the S memory locations of the selected page P at a selected access rate and to gate the so-accessed switching information to the power-switching device pairs to thereby synthesize the desired waveform.

17 Claims, 6 Drawing Figures

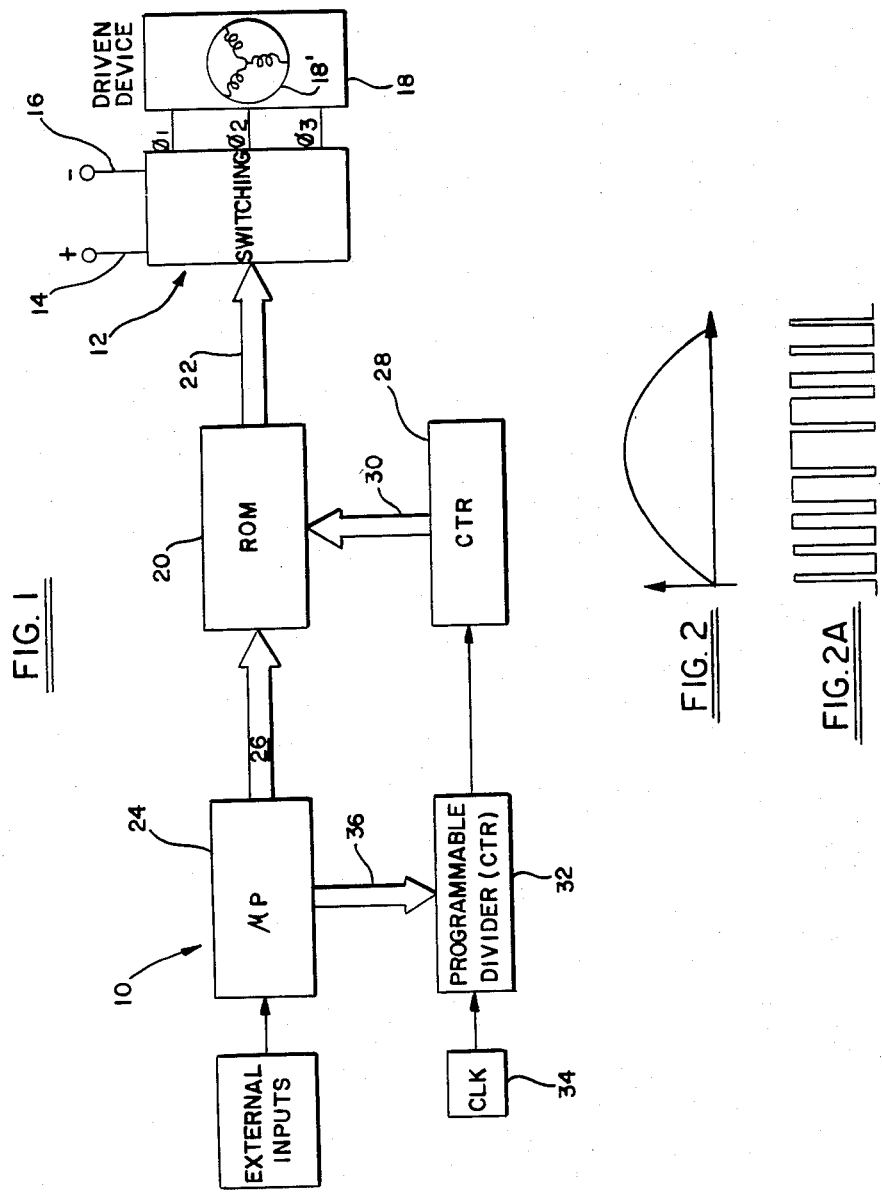

WAVEFORM SYNTHESIZER AND MOTOR CONTROLLER

CROSS-REFERENCE TO RELATED APPLICATION

This application is a continuation-in-part of U.S. patent application Ser. No. 348,319, Filed Feb. 12, 1982, now U.S. Pat. No. 4,447,786, by the inventors hereof and in common assignment herewith.

BACKGROUND OF THE INVENTION

The present invention relates to waveform synthesizers and, more particularly, to waveform synthesizers for producing electrical power outputs having waveforms of selected wave shape and/or frequency for driving and controlling AC machinery including induction, synchronous, and other type AC motors.

AC motors including single and poly-phase induction motors have found widespread application in industry where they are typically driven at a relatively fixed rotational speed by a constant frequency single or polyphase power source. Various speed controllers for AC motors are known and have included speed controllers that synthesize a single or poly-phase waveform at a desired frequency by selectively switching oppositely poled DC power to the motor windings with the switching frequency controlling the motor speed. Known synthesizers take the form of analog control circuits, digital control circuits, or hybrid combinations of the two. Both analog and digital synthesizers usually require a large number of circuit components, although digital synthesizers may be fabricated at less cost because of the ease with which many digital components can be manufactured as integrated circuit devices.

One example of the many industrial and commercial applications of AC motors is their use in portable handheld power tools. The AC motors used in hand-held power tools have usually been restricted to the constant speed, low torque type. Variable speed AC motors have not found widespread applications in portable power tools since known synthesizers for effecting speed control are either too costly from a marketing standpoint and/or too large for incorporation into the typical compact hand-held power tool. The use of a variable speed AC motor has certain advantages over the widely used commutator/brush-type motor in both the power tool and other variable speed applications in that the AC motor does not require the commutator/brush interface and, accordingly, can be thought of as a commutatorless motor. The elimination of the commutator/brush interface eliminates the problems of commutator and brush wear, electromagnetic interference generated as a consequence of commutation, and eliminates the brush sparking that occurs during commutation.

As can be readily appreciated, a physically compact and low-cost speed controller for the various types of AC motors including single and poly-phase motors would permit the wider application of these types of motors including their incorporation into variable speed power tools.

SUMMARY OF THE INVENTION

It is an object of the present invention, among others, to provide a relatively low cost and compact waveform synthesizer for generating selected AC waveforms, while providing very high quality waveforms and flexible control.

It is another object of the present invention to provide a waveform synthesizer that is suitable for generating single or poly-phase waveforms that can be selectively controlled in terms of frequency and wave shape.

It is another object of the present invention to provide a waveform synthesizer for providing an output power waveform of selectively variable wave shape and frequency in which the number of discrete electrical components required is comparatively small.

It is another object of the present invention to provide a waveform synthesizer which provides output power of a selected waveform and frequency and which can be used in driving all types of AC machinery including induction, synchronous, and other type motors as well as AC motors of the type used in portable, handheld power tools.

In accordance with these objects and others, the present invention provides a low cost and compact waveform synthesizer for driving AC machinery including AC motors or the like which includes power-switching device pairs that selectively switch power pulses of selected pulse width, spacing, and repetition rate from an oppositely poled direct current power source to the power receiving device to synthesize a current waveform of selected wave shape and frequency. The power-switching device pairs are selectively switched by a microprocessor controlled memory that has its memory locations divided into P addressable pages with each page having S sequentially accessible memory locations containing digital switching information for controlling the power-switching pairs. The microprocessor is configured to address one of the P available memory pages and to set a clock-driven programmable counter to sequentially access the S locations of the address page at a selected access rate. The information sequentially accessed from the S locations of the addressed page provides switch information for the power switching device pairs for one alternation (0°–180°) of each output wave with the S locations re-accessed and the so re-accessed output information complemented to provide switching information for the next successive alternation (180°–360°). Accordingly, switching information for only one alternation can be used to provide symmetrical alternations about the zero axis. The microprocessor selects a page P in memory and presets the programmable counter in response to prestored instructions, user input instructions or condition-responsive information, such condition-responsive information including variations in the magnitude of the supply voltage.

A waveform synthesizer in accordance with the present invention permits the synthesized wave shapes to be quickly changed by merely addressing another page of the memory at any point in the outiut waveform and the frequency of the synthesized waveform to be quickly changed by merely re-programming the programmable counter so that the S locations of the selected page are accessed at a faster or slower rate.

A waveform synthesizer in accordance with the present invention is particularly suitable for driving AC machinery including AC motors of the induction, synchronous, and related type in various applications including, for example, the portable hand-held power tool environment. The inventive circuit provides substantial flexibility in the synthesis of high quality output wave shapes and yet can be implemented using a relatively low number of integrated circuits to provide a reliable, physically compact, and inexpensive product.

BRIEF DESCRIPTION OF THE DRAWINGS

FIG. 1 illustrates a conceptual block diagram of a waveform synthesizer in accordance with the present invention;

FIG. 2A is an idealized graphical illustration of the first positive current alternation of a synthesized current waveform;

FIG. 2B is an idealized graphical illustration of the pulse width modulated voltage output for synthesizing the current waveform of FIG. 2A;

DESCRIPTION OF THE PREFERRED EMBODIMENT

Figure 3:
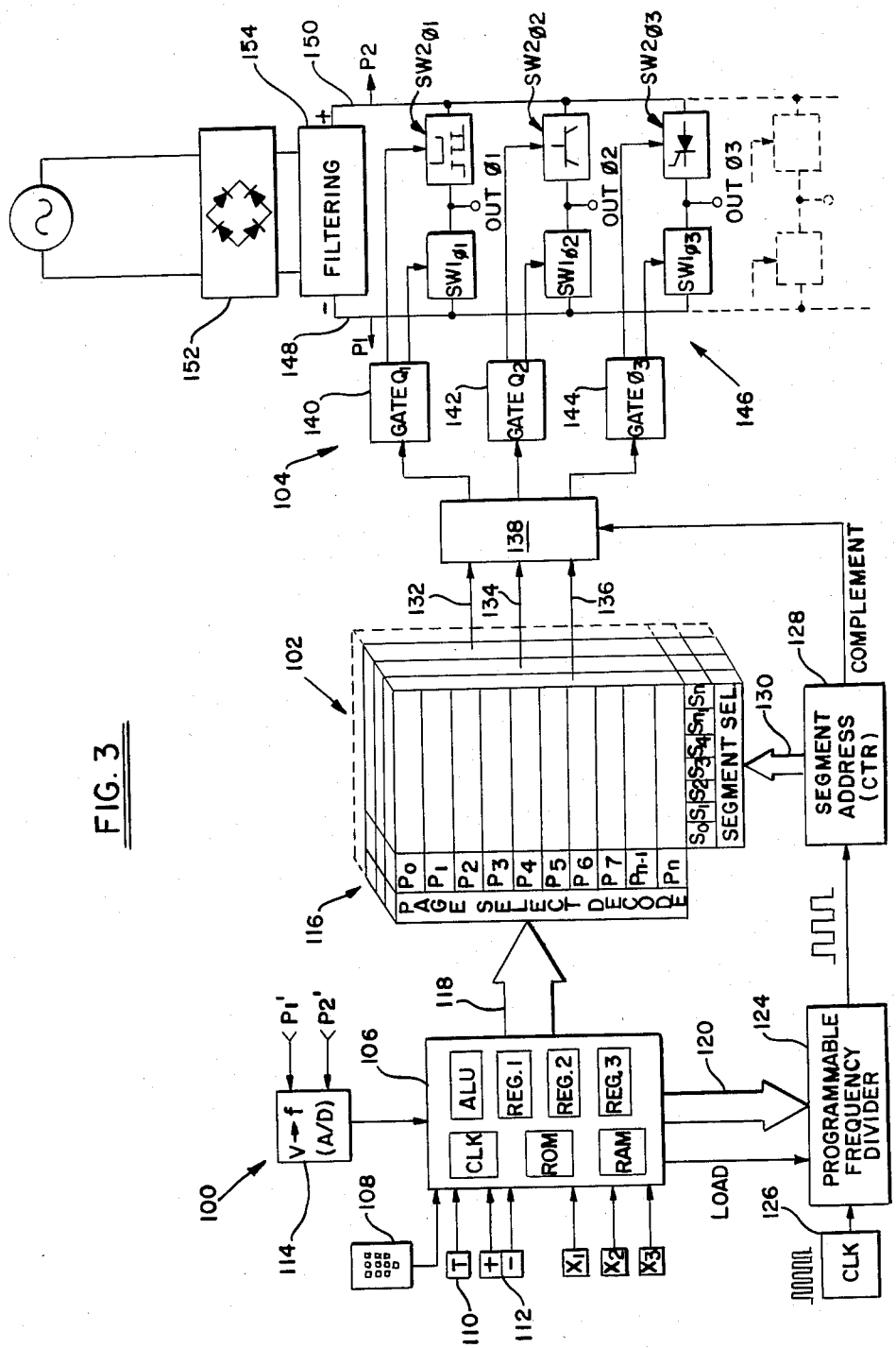
FIG. 3 illustrates a schematic block diagram of an operative embodiment of a waveform synthesizer in accordance with the present invention.

A conceptual block diagram of a waveform synthesizer in accordance with the present invention is shown in FIG. 1 and generally referred to therein by the reference character 10. The waveform synthesizer 10 includes a switching device 12 that receives input power from positive and negative buses 14 and 16 of a DC power supply (not shown) and selectively switches that input power, as described more fully below, into an inductive load 18, such as the exemplary three-phase induction motor 18' illustrated in FIG. 1, to thereby synthesize three power phases $\phi_1$, $\phi_2$, and $\phi_3$ of selected wave shape and frequency. Since the switching device 12 is switching DC voltage into the load 18, it is desirable that the load have some inductive reactance to develop the desired wave shape. Where the waveform synthesizer 10 is used to drive a poly-phase induction motor 18', the inductance of the motor windings is sufficient for waveform synthesis purposes, although, in some applications, it may be necessary or desirable to add additional inductive reactance to the output power circuits.

The switching commands for the switching device 12 are provided from a waveform memory (ROM) 20 through a control bus 22. The memory 20 is under the control of and addressed by a microprocessor 24 through an address bus 26 and an address counter 28 through another address bus 30. The address counter 28 operates in response to an input from a programmable divider 32 that receives an input from a clock 34 with the divide ratio of the programmable divider 32 established by the microprocessor 24 through a control bus 36.

As explained more fully below in relationship to FIG. 3, the memory 20 is divided into P pages corresponding to P available waveforms with each page further divided into S memory locations with each memory location containing switch control information in binary format. The binary information stored in the S locations of each of the pages P represents selected waveforms, usually sine waves or near sine waves, suitable for driving AC machinery although other wave shapes can be readily synthesized.

The microprocessor 24, in response to either internal instructions or externally inputted instructions provided through, for example, a user input interace and/or condition responsive transducers, addresses a selected one of the P available pages within the memory 20 through the address bus 26 and also sets the divide ratio of the programmable divider 32 through the control bus 36. The so-programmed divider 32 is effective to divide down the pulse output of the clock 34 at the preset divide raio with the so-divided clock output provided as an input to the address counter 28 which increments and recycles on a periodic basis. The incrementing output of the counter 28, through the address bus 30, sequentially accesses the S locations of the selected memory page to gate the stored binary information, in a successive manner, to the switching device 12 which then switches the supply power to the load 18 to obtain the desired waveform.

FIG. 2 illustrates one-half of an idealized synthesized current sine wave for one of the output phases while FIG. 2A illustrates the corresponding switched voltage output of the switching device 12. As shown in FIG. 2A, the switching device 12 provides a pulse width switch-modulated output. The amplitude of the output pulses is controlled by the supplied DC voltage, and the duration of each pulse and the inter-pulse spacing are each independently controlled by the switching information provided from the memory 20. As shown in FIG. 2A, the initial pulse for synthesizing the exemplary waveform portion of FIG. 2 has a comparatively small pulse duration with the next successive pulses having progressively larger pulse durations. The center pulse has the largest pulse duration with the succeeding pulses having progressively diminishing durations. As is also shown in FIG. 2A, the inter-pulse spacing is largest after the initial, narrow pulse and progressively diminishes toward the wide, center pulse and then progressively increases after the center pulse. As can be appreciated, the present invention permits independent control of both the pulse duration and inter-pulse spacing. While the pulse duration and the inter-pulse spacing have been shown as symmetrically distributed about the center pulse, the pulse duration and inter-pulse spacing can be asymmetrical to control the synthesized wave shape. Since the output pulses of FIG. 2A are provided to an inductive load, the pulse width of a pulse will control the rise time of the synthesized waveform and, by controlling the number, spacing and width of the output pulses, a waveform of the desired shape can be obtained, as for example, the sine wave representation of FIG. 2. As can be appreciated by those skilled in the art, the sine wave representation of FIG. 2 is an idealized representation and the actual waveform obtained will vary in 'smoothness' depending upon the number of pulses used to synthesize the waveform and the inductance of the load. Since the pulse duration and inter-pulse spacing are precisely controllable, synthesized waveforms having very low harmonic content can be achieved. Also, the progression of on and off times of FIG. 2A may not always be used; especially at low speeds there may be interspersed wider and narrower periods.

In order to change the wave shape of the synthesized output waves, it is only necessary that the microprocessor 24 address another page P within the memory 20 to thereby provide different switching information to the switching device 12 to change the output waveform. To change the frequency of the synthesized output waveform, it is only necessary that the microprocessor 24 change the programmable frequency divider 32 to a new divide down ratio to change the count period of the address counter 28.

The inventive circuit permits an instantaneous transition from one waveform to the other in an asynchronous manner since the various pages P within the memory 20 can be re-addressed mid-cycle without waiting for the conclusion of a timing or synchronizing period and, likewise, the frequency can be changed mid-cycle by merely changing the divide down ratio of the programmable divider 32. This latter aspect is particularly useful when driving poly-phase induction motors at very low frequencies for example, e.g. 6-8 Hz., and when increasing the drive frequency in small increments, for example, 1 Hz. increments, thereby permitting the very smooth speed control of AC motors at low speed.

A practical embodiment 100 of the inventive waveform synthesizer is shown in FIG. 3 and includes a control section 102 and a power switching section 104.

The control section 102 includes a microprocessor 106, preferably a '1-chip' microprocessor, that includes an arithmetic logic unit (ALU), clock (CLK), a read only memory (ROM), a random access memory (RAM), and one or more working registers (REG. 1-3). Although many general purpose microprocessors are suited for the intended application, a preferred microprocessor is the 8-bit 8048 microprocessor having both an on-chip clock and random access memory and manufactured by the Intel Corporation of Santa Clara, Calif., 95051.

Input information is provided to the microprocessor processor 106 through its input port by various input devices including, for example, a numeric key pad 108, a trigger-type control 110, an increment/decrement switch 112, a voltage-to-frequency converter 114, and-/or various transducers $X_1 \ldots X_n$. The voltage-to-frequency conventer 114, as described more fully below, provides supply voltage magnitude and variation information to the microprocessor 106 so that the output waveforms are desirably uniform despite supply voltage changes. The transducers $X_1 \ldots X_n$ can include sensors for supplying, for example, speed, torque, temperature, and slip information. While not specifically shown in FIG. 3, a numeric read-out device can be provided to display various conditions or operating states of the waveform synthesizer or of the driven device.

The microprocessor 106 is coupled to a waveform memory 116 through an address bus 118 connected from selected of the microprocessor address output lines to the page select decoder portion of the waveform memory. The microprocessor 106 is also connected through a control bus 120 to the parallel load inputs of a programmable frequency divider 124. The parallel loading of the divide ratio of the programmable frequency divider 124 is accomplished through appropriate command signals along the control line 'LOAD'. A system clock 126 provides a clock pulse output at a fixed pulse repetition rate (e.g. 10-20 MHz) to the programmable frequency divider 124. The programmable frequency divider 124 provides a divided-down clock pulse output to the input of a segment address counter 128 which, in turn addresses, through the address bus 130, specific memory cell locations S within the waveform memory 116. In the preferred embodiment, the programmable frequency divider 124 and the segment address counter 128 can be fabricated from cascaded 74LS161 presettable counters or like devices.

The waveform memory 116 is organized into a plurality of addressable pages $P_0, P_1 \ldots P_{n-1}, P_n$ for each output phase. In FIG. 3, the memory 116 is shown as organized for providing three output phases (solid line illustration), although more or less output phases are possible as represented by the broken line portion of the memory. Each page P is selectively addressable in a random manner by the address word provided from the microprocessor 106 through the page address bus 118. In a preferred embodiment, the memory 116 is divided into 64 separate pages with each page representing a preferred waveform, that is, a waveform having a preferred wave shape or amplitude. As can be appreciated, other page numbers are permissible including, for example, 128 or 256 pages. Each page P within the memory 116 has S memory cells with each cell representing one segment $S_0, S_1 \ldots S_{n-1}, S_n$ of each alternation of the synthesized output wave. The number of segments S into which each page P of the memory 116 is divided depends upon the wave shape resolution desired for the synthesized output wave. For example, 180 segments can be provided for the first 180 degrees of the synthesized waveform so that switching control can be provided in one-degree increments. In practice, 64, 128 and 256 or more segments are suitable for synthesizing output waves for driving AC machinery, although a higher number of segments S per page P provides greater flexibility in synthesizing the output waves and provides for a smoother output wave.

As can be appreciated by those skilled in the art, the topology illustrated in FIG. 3 for the waveform memory 116 is for purpose of explanation only, and, in practice, the actual organization of the waveform memory 116 can be different. In the preferred embodiment, the memory 116 can be constituted using standard ROM's or EPROM's including the 2732 and 2764 (or equivalent) memories manufactured by the Intel Corporation.

The output of the accessed segments S of the addressed page P, in the form of binary ones and zeros, is provided along control lines 132, 134, and 136 to the switching section 104, which includes a data selector 138 which accepts the control bits from lines 132, 134, and 136 and provides the switching information to the appropriate gating circuits 140, 142, and 144 for the first, second, and third phase switches.

The switching network 146 includes positive and negative buses 148 and 150 that receive direct current power from a power supply that includes a conventional AC-to-DC bridge rectifier 152 and associated filtering circuits 154. For each phase, positive side and negative side gatable switches $SW1_{\phi 1}$ and $SW2_{\phi 1}$, $SW1_{\phi 2}$ and $SW2_{\phi 2}$, and $SW1_{\phi 3}$ and $SW2_{\phi 3}$ are provided from the positive and negative buses 148 and 150 to common output nodes $OUT_{\phi 1}$, $OUT_{\phi 2}$, and $OUT_{\phi 3}$, respectively. As shown in broken line illustration in FIG. 3, additional switch pairs may be provided for additional phases.

The voltage-to-frequency converter 114 is connected to the negative and positive buses 148 and 150 through connection interfaces P1/P1' and P2/P2', respectively. The voltage-to-frequency converter 114 provides a pulse output to the microprocessor 106 at a frequency that varies with and is proportional to the magnitude of the DC supply. As explained more fully below, the microprocessor 106 utilizes the supply voltage information from the voltage-to-frequency converter 114 to provide for optimum motor operation where the supply voltage varies. While a voltage-to-frequency converter has been disclosed, the desired function can also be accomplished using an analog-to-digital converter.

Various types of gatable switching devices are suitable for the switching function including bipolar transistors, MOS transistors, thyristors including TRIAC'S and SCR'S, and other devices. In practice, enhancementmode MOS field-effect transistors such as IRF 350's are preferred since they have high switching speeds and modest gate drive requirements. Of course, the circuit details would be different if thyristors are used because of commutation requirements as is well known in the art.

The on-chip ROM of the microprocessor 106 can be encoded to provide one of several motor start-up and run profiles. For example, the microprocessor 106 can be controlled to cause the motor to start and run to a first speed level in a first selected time interval, remain at that first speed level for a second time interval, and then change speed to a second speed level. In additional to being operable in response to pre-encoded motor control profiles, the microprocessor 106 can effect motor control from external inputs. More specifically, the microprocessor 106 can receive its on/off and run speed information from a user accessible key pad 108 by which the start and stop commands and the desired run speeds are entered by depressing selected of the keys. If desired, a numeric display (not shown) can be provided to read-out the desired and actual run speeds. Where the waveform synthesizer is used in a portable hand-held tool, speed control can be effected in a continuously variable manner using a conventional trigger-type control input 110. Also, speed control can be obtained by an increment/decrement switch 112 that increases or decreases run speed as a function of the time that the particular increment or decrement portion of the switch 112 is depressed. In addition to the above, condition responsive transducers $X_1 \ldots X_n$ can be provided to control or modify the wave shape and/or frequency in response to external conditions. Among others, these transducers can include transducers for monitoring motor speed, motor torque, and motor temperature. The output of the transducers can be used for display purposes or, if desired, provide a measure of feedback to regulate run speed or to control rotor slip. As can be appreciated by those skilled in the art, where the particular external input device provides a direct analog output, an analog-to digital (A/D) converter (not shown) is required to provide a microprocessor-compatible digital input.

In operation, the microprocessor 106, operating either in accordance with internal pre-programmed encoding or external inputs as discussed above, selects one of the P available pages of the waveform memory 116 by appropriate control of the addressing bus 118. Concurrently, a divide-down ratio, representative of the frequency of the desired output wave, is provided to the parallel inputs of the programmable frequency divider 124 through the control bus 120 and loaded by an appropriate signal applied to the LOAD input. The programmable frequency divider 124 is effective to divide down the pulse output of the clock 126 to the lower pulse repetition rate requested by the microprocessor 106. The counted-down output of the programmable frequency divider 124 is provided to the input of the segment address counter 128 which counts the divided down input pulses in a sequential manner and presents a parallel output through the address bus 130 that sequentially addresses the segments S of the addressed page P in a periodic manner. As the segments S of the addressed page are accessed, binary information in terms of ones and zeros is provided to the switch data selector 138 along lines 132, 134, and 136 which then provides switching commands through appropriate gate circuits 140, 142, and 144 to the switching devices described above to effect on and off switching for selected on and off time periods and in a selected phase relationship so that voltage pulses of varying width and spacing are provided to the load through the output nodes $OUT_{\phi1}$, $OUT_{\phi2}$, and $OUT_{\phi3}$. As has been described above, the load is inductive in nature and thus causes the synthesis of a current waveform of the desired amplitude, profile, and frequency. The S memory cell locations for each addressed page contain sufficient information to synthesize the first alternation (0°–180°) of each of the output phases. After all the S memory call locations for the addressed page are accessed, the segment address counter 128 recycles to re-access the S memory locations and provide a 'COMPLEMENT' signal along the complement control line that is effective to complement the switch control signals through the data selector 138 so the switching devices are effective to synthesize the next sucessive alternation (180°–360°) of the output wave form. The data selector 138 can also be arranged to reverse the order of connection between lines 132, 134, and 136 to the gate circuits 140, 142, and 144 to effect reversal by changing the phase relationship. This can be done electronically under control of the microprocessor 106. In the event a wave shape or frequency change is desired, for example, by appropriate operation of the key pad 108, trigger 110, increment/decrement switch 112, or the external transducers $X_n$, another page P of the waveform memory 116 can be immediately addressed and/or the frequency divide ratio of the programmable frequency divider 128 changed.

Figure 4:
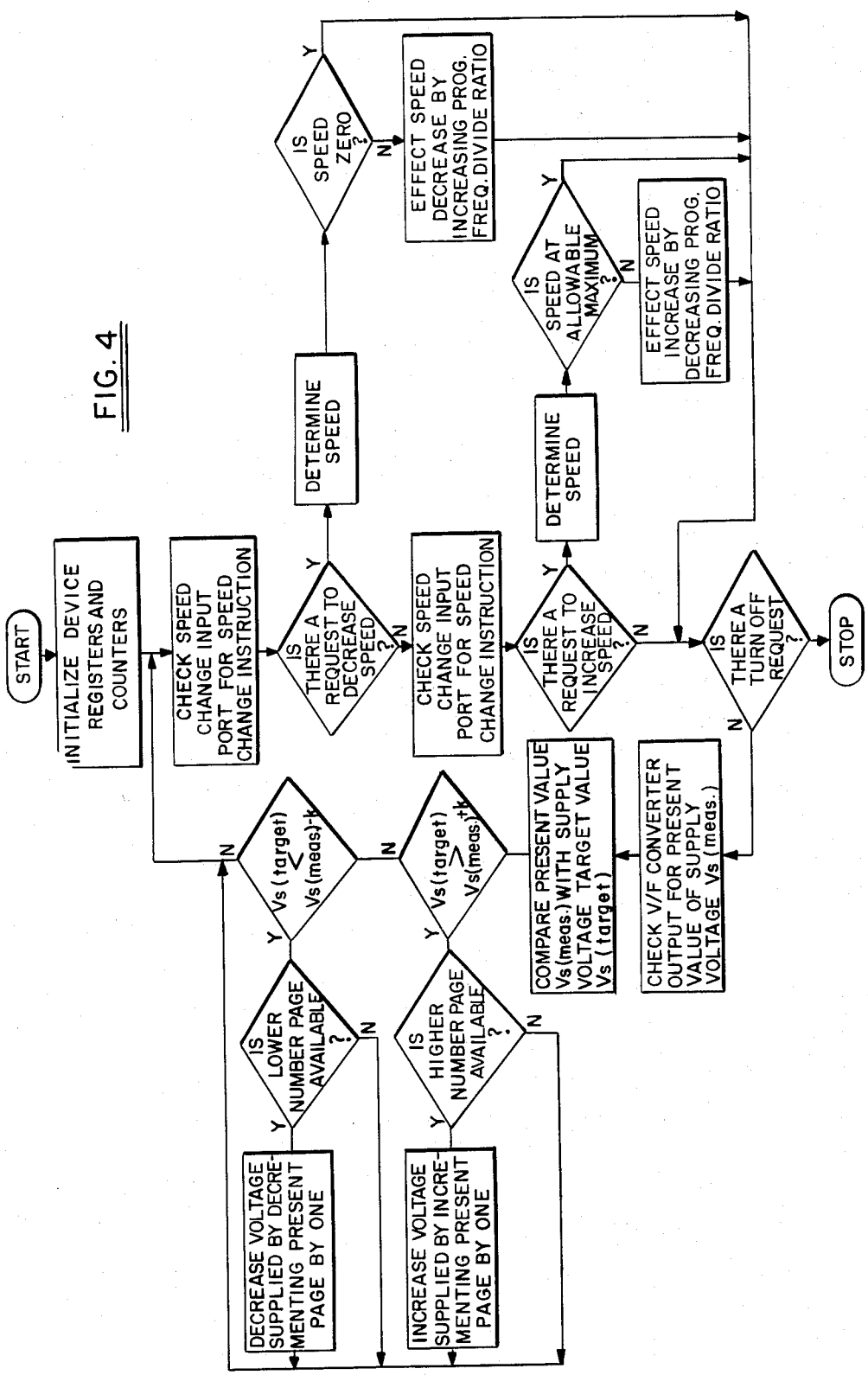
FIG. 4 is a flow diagram of one suitable control sequence for effecting operative control of the waveform synthesizer of FIG. 3.

A summary flow diagram representative of a control architecture suitable for effecting speed increase and decrease of a variable speed motor in a manner responsive to the supply voltage magnitude is illustrated in FIG. 4. As shown therein, the various device registers and counters, after start-up, are initialized; the initialization including the provision of a working register or memory location containing a digital target valve of the DC supply voltage $V_{s(t)}$ required for optimum motor operation. Thereafter, the speed change input port is checked for the presence of a speed change instruction. This instruction may come from one of the several external sources as discussed above. Thereafter, the instruction is queried to determine whether there is a request to decrease speed or increase speed. If there is a request to decrease speed, the present motor speed is determined, and, if greater than zero, the speed decrease is effected by increasing the divide ratio of the programmable frequency divider. If, on the other hand, there is a request to increase speed, a determination is made as to whether the motor is at the maximum allowable speed and, if not, the speed increase is effected by decreasing the divide ratio of the programmable frequency divide. After execution of the speed change request, a determination is made as to whether a turn-off request is present, and, if not, a supply power subroutine is entered to compensate for variations in the supply power. In this subroutine, it is assumed that the contents of the various memory locations within the pages P of the memory 116 increase the voltage supplied (and consequently the power delivered to the motor) with ascending page numbers. The magnitude of the supply voltage is determined from the contents of the aforedescribed register that periodically sums the output of the voltage-to-frequency converter 114. Thereafter, the measured supply voltage $V_{s(m)}$ is compared with the target value $V_{s(t)}$. If the target value $V_{s(t)}$ is greater than the measured supply voltage $V_{s(m)}+K$ (K being a constant having an arbitrary value), a determination is made as to whether or not a higher number page is available and, if so, the output voltage is increased by incrementing the page address by one. If, on the other hand, the target value of the supply voltage $V_{s(t)}$ is less than the measured supply $V_{s(m)}-K$, a determination is made as to whether a lower numbered page number is available, and, if so, the output voltage is decreased by decrementing the page number by one. Thereafter, the subroutine returns to recycle. As can be appreciated, the aforedescribed supply power subroutine can maintain a relatively constant voltage-time area of the output wave form so that variations in supply power do not cause consequent over or under driving of the motor. Thus motor power and torque can be maintained during periods of low supply voltage and/or heavy loading; conversely, motor saturation can be reduced during periods of high line voltage and/or light loading.

Figure 5:
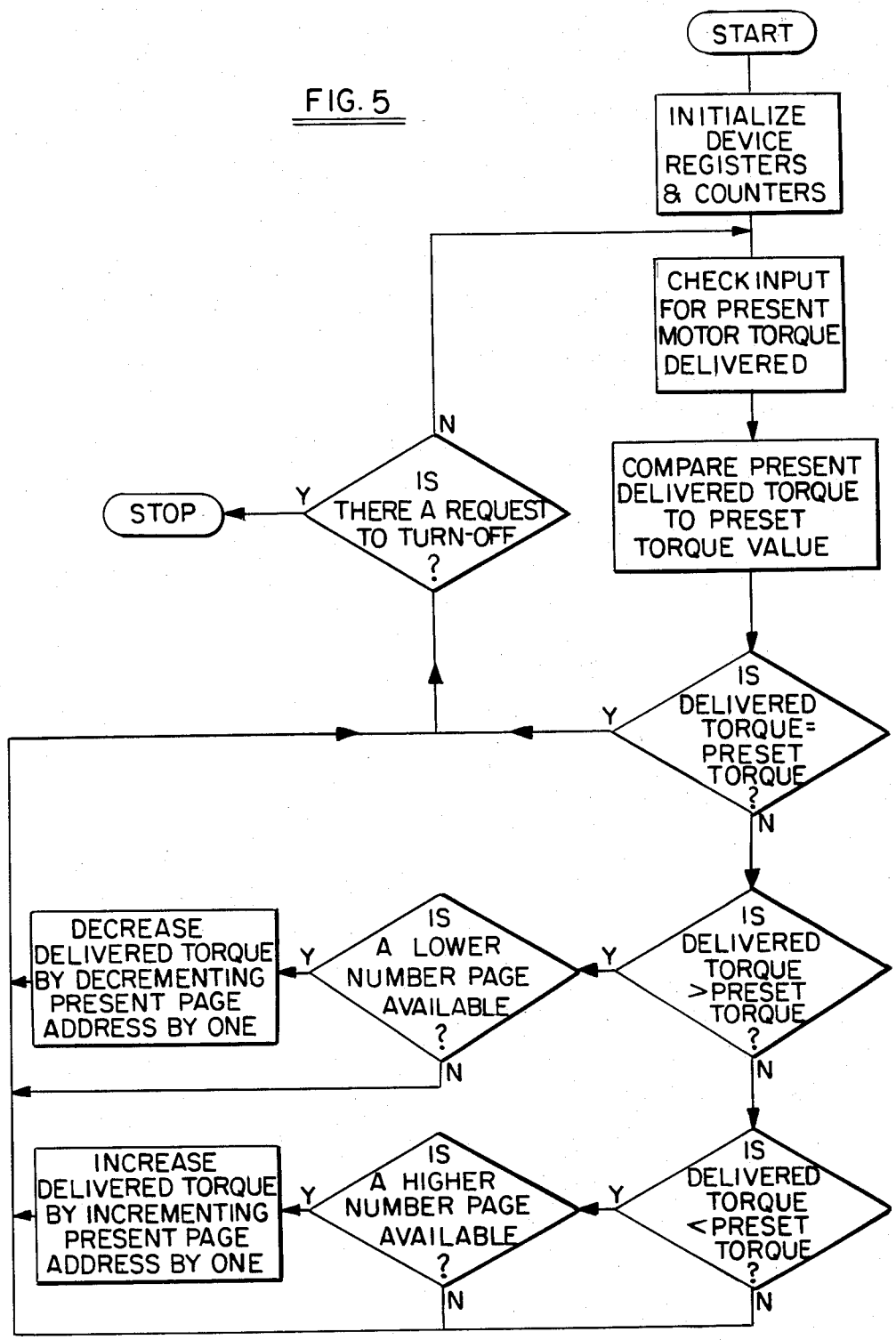
FIG. 5 is a flow diagram of another suitable control sequence for effecting operative control of the waveform synthesizer of FIG. 3.

A second summary flow diagram representative of a control architecture suitable for providing constant output torque for a motor is illustrated in FIG. 5. In providing output torque control, a torque sensor measures, either directly or indirectly, the motor torque provided to the driven load. Torque sensing can be provided, for example, by determining the actual motor output speed and the theoretical run speed available as a consequence of the frequency of the supplied power waveform and the particular motor winding configuration. The percentage difference between the two is representative of the motor 'slip', and slip percentages greater than a nominal slip value are a representative measure of the torque delivered by the motor. Other arrangements for measuring delivered torque can include a direct torque measuring sensor or indirect torque sensing by measuring the current flow to the motor windings. In controlling the motor torque, the various pages P within the memory 116 are provided with binary control information for synthesizing various wave shapes that are effective to increase or decrease the electrical power delivered to the motor and to thereby increase or decrease the torque delivered by the motor. For the purposes of the flow diagram of FIG. 5, it is assumed that increasing page numbers synthesize waveforms that increase the delivered motor torque while decreasing page numbers provide waveforms that decrease the delivered torque. As shown in FIG. 5, the various device registers and counters, after start-up, are initialized and thereafter the torque control sequence is carried out by checking the measured-torque input port for the actual delivered torque and comparing the measured torque information with the predetermined or desired torque value located in an associated working register or ROM location. Thereafter, the result is queried and, if the two values are equal, the routine is repeated after checking for a turn-off command. If the actual torque is greater than the predetermined or desired torque value, a check is made to determine if a lower number page is available in memory and, if so, the present page address is decremented by one to provide a lower delivered torque. If, on the other hand, the actual torque is less than the predetermined or desired torque value, a check is made to determine if a higher page number is available in memory and, if so, the present page address is increased by one to provide a new address that delivers greater torque to the load.

As can be appreciated, the inventive circuit has a substantial number of advantages over prior waveform synthesizers used for driving AC machinery including single and poly-phase induction motors. More specifically, the chip count is comparatively small and, accordingly, the complete circuit is amenable to fabrication on a single printed circuit board of comparatively small physical dimensions. Also, the relatively small chip count provides for a relatively low-cost waveform synthesizer and motor controller. The disclosed invention is suitable for a wide variety of AC machinery applications including those applications using AC motors of the single or poly-phase type. Because of the relatively low chip count and cost of the circuit components, the invention is suitable for application to power tools and particularly portable hand-held power tools where physical size and cost factors are important design criteria. Since the waveform synthesizer can effect changes of amplitude and frequency anywhere along the output power curve by merely readdressing a page P within the waveform memory 116 or changing the divide ratio of the programmable divider 124, immediate control of the output waveform is possible without waiting, for example, for a reset signal or the completion of a synchronizing cycle. One particular advantage of the waveform synthesizer disclosed is that a very wide dynamic speed range is available, that is, wave frequencies as low as 6 Hz. or lower can be generated to provide very effective low speed operations of an AC motor as well as waveforms of many thousands of Hz. to also provide high speed control. When the inventive waveform synthesizer and a poly-phase motor are incorporated into a hand-held portable power tool, a number of substantial advantages are provided over conventional commutator-brush motor arrangements using thyristor or SCR speed control in that a very wide dynamic range is available, excellent low speed control of the motor is obtained, and the disadvantages associated with the commutator and brush structures of the conventional motors are eliminated.

As can be appreciated by those skilled in the art, various changes and modifications may be made to the waveform synthesizer and motor controller of the present invention without departing from the spirit and scope of the invention as defined in the appended claims and their legal equivalent.

We claim:

1. A motor controller for selectively controlling an AC motor by providing a controlled power waveform thereto of selected wave shape and frequency, said motor controller comprising:

a waveform memory means divided into P addressable pages representing P available wave shapes with each page divided into S addressable segments, the segments of each page having binary switch control information stored therein, the pages and the segments of each page addressable through a memory address port to provide the so-addressed switch control information to switch control data lines;

selectively gatable switch means connected between a DC power source means to at least one output power node for connection to the motor to be controlled and connected to said switch control data lines;

stored-program control means connected to said waveform memory means for addressing a selected one of the pages available in said waveform memory means;

presettable frequency divider means connecter to a source of input pulses having a selected repetition rate and connected to said waveform memory means for addressing the segments of the addressed page, said frequency divider means providing output pulses at a selected divide-down ratio for addressing the segments of the addressed page at a rate determined by said output pulses;

said stored-program control means connected to said presettable frequency divider means for setting the divide ratio thereof, the frequency divider means addressing the segments of the addressed page at an addressing rate determined by the output pulses thereof to cause the gatable switch means to switch DC power to the output node to synthesize a waveform of selected wave shape in accordance with the stored binary switch control information of the addressed page and of selected frequency in accordance with the segment addressing rate; and analog-to-digital converter means connected to the DC power supply means and to said stored-program control means for providing a digital representation to said stored-program control means of a characteristic associated with the DC power.

2. A motor controller for selectively controlling a poly-phase AC motor having at least two power phases by providing a controlled poly-phase power waveform thereto of selected wave shape and frequency, said motor controller comprising:

a waveform memory means divided into P addressable pages representing P available wave shapes with each page divided into S addressable segments, the segments of each page having binary switch control information stored therein, the pages and the segments of each page addressable through a memory address port to provide the so-addressed switch control information to switch control data lines;

selectively gatable switch means connected between a DC power source means to at least two output power nodes for connection to the motor to be controlled and connected to said switch control data lines;

stored-program control means connected to said waveform memory means for addressing a selected one of the pages available in said waveform memory means;

presettable frequencey divider means connected to a source of input pulses having a selected repetition rate and connected to said waveform memory means for addressing the segments of the addressed page, said frequency divider means providing output pulses at a selected divide-down ratio for addressing the segments of the addressed page at a rate determined by said output pulses;

said stored-program control means connected to said presettable frequency divider means for setting the divide ratio thereof, the frequency divider means addressing the segments of the addressed page at an addressing rate determined by the output pulses thereof to cause the gatable switch means to switch DC power to the at least two output nodes to synthesize a waveform of selected wave shape in accordance with the stored binary switch control information of the addressed page and of selected frequency in accordance with the segment addressing rate; and analog-to-digital converter means connected to the DC power supply means and to said stored-program control means for providing a digital representation to said stored-program control means of a characteristic associated with the DC power.

3. A motor controller for selectively controlling a poly-phase induction motor having at least two power phases by providing a controlled power waveform thereto of selected wave shape and frequency, said motor controller comprising:

a waveform memory means divided into P addresable pages representing P available wave shapes with each page divided into S addressable segments, the segments of each page having binary switch control information stored therein, the pages and the segments of each page addressable through a memory address port to provide the so-addressed switch control information to switch control data lines;

selectively gatable switch means connected between DC power souce means to at least two output power nodes for connection to the motor to be controlled and connected to said switch control data lines;

a stored-program-controlled processor means having an address output port connected to said memory address port for providing a page select address and having an address rate control port for providing an addressing rate select signal;

presettable frequency divider means connected to a source of input pulses having a selected repetition rate and connected to said waveform memory means for addressing the segments of the addressed page, said frequency divider means providing output pulses at a selected divide-down ratio for addressing the segments of the addressed page at a rate determined by said output pulses;

said stored-program control means connected through said address rate control port to said presettable frequency divider means for setting the divide ratio thereof, the frequency divider means addressing the segments of the addressed page at an addressing rate determined by the output pulses thereof to cause the gatable switch means to switch DC power to the at least two output nodes to synthesize a waveform of selected wave shape in accordance with the stored binary switch control information of the addressed page and of selected frequency in accordance with the segment addressing rate; and analog-to-digital converter means connected to the DC power supply means and to said stored-program control means for providing a digital representation to said stored-program control means of a characteristic associated with the DC power.

4. The motor controller claimed in claims 1, 2, or 3, wherein said analog-to-digital converter means comprises a voltage-to-frequency converter.

5. The motor controller claimed in claims 1, 2, or 3 wherein said stored-program means include an input port means for receiving waveform-determining information from an external device.

6. The motor controller claimed in claim 5, wherein said external device comprises a key pad means.

7. The motor controller claimed in claim 5, wherein said external device comprises a trigger-switch means.

8. The motor controller claimed in claim 5, wherein said external device includes at least one condition responsive transducer.

9. The motor controller claimed in claim 5, wherein said external device includes an increment/decrement switch means.

10. The motor controller claimed in claims 1, 2, or 3, wherein each page of said memory contain binary switching information for synthesizing the first half of a waveform and further comprising means for complementing the binary switching information for synthesizing the second half of a waveform.

11. A waveform synthesizer for providing a waveform of selected frequency and wave shape for driving an AC waveform utilizing device, said waveform synthesizer comprising:
- a waveform memory means divided into P addressable pages representing P available wave shapes with each page divided into S addressable segments, the segments of each page having binary switch control information stored therein, the pages and the segments of each page addressable through a memory address port to provide the so-addressed switch control information to switch control data lines;
- selectively gatable switch means connected between a DC power source means to at least one output power node for connection to the waveform utilizing device to be controlled and connected to said switch control data lines; and
- stored-program control means connected to said waveform memory means for addressing a selected one of the pages available in said waveform memory means;
- presettable frequency divider means connected to a source of input pulses having a selected repetition rate and connected to said waveform memory means for addressing the segments of the addresed page, said frequency divider means providing output pulses at a selected divide-down ratio for addressing the segments of the addressed page at a rate determined by said output pulses;
- said stored-program control means connected to said presettable frequency divider means for setting the divide ratio thereof, the frequency divider means addressing the segments of the addressed page at an addressing rate determined by the output pulses thereof to cause the gatable switch means to switch DC power to the output node to synthesize a waveform of selected wave shape in accordance with the stored binary switch control information of the addressed page and of selected frequency in accordance with the segment addressing rate; and
- analog-to-digital converter means connected to the DC power supply means and to said stored-program control means for providing a digital representation to said stored-program control means of a characteristic associated with the DC power.

12. A waveform synthesizer for selectively controlling an AC machine by providing a controlled power waveform thereto of selected wave shape and frequency, said waveform synthesizer comprising:
- a waveform memory means divided into P addressable pages with each page divided into S addressable segments, the segments of each page having binary switch control information stored therein, the pages and the segments of each page addressable through a memory address port to provide the so-addressed switch control information to switch control data lines;
- selectively gatable switch means connected between a DC power source means to at least two output power nodes for connection to the AC machine to be controlled and connected to said switch control data lines; and
- stored-program control means connected to said waveform memory means for addressing a selected one of the pages available in said waveform memory means;
- presettable frequency divider means connected to a source of input pulses having a selected repetition rate and connected to said waveform memory means for addressing the segments of the addressed page, said frequency divider means providing output pulses at a selected divide-down ratio for addressing the segments of the addressed page at a rate determined by said output pulses;
- said stored-program control means connected to said presettable frequency divider means for setting the divide ratio thereof, the frequency divider means addressing the segments of the addressed page at an addressing rate determined by the output pulses thereof to cause the gatable switch means to switch DC power to the at least two output nodes to synthesize a waveform of selected wave shape in accordance with the stored binary switch control information of the addressed page and of selected frequency in accordance with the segment addressing rate; and
- analog-to-digital converter means connected to the DC power supply means and to said stored-program control means for providing a digital representation to said stored-program control means of a characteristic associated with the DC power.

13. A waveform synthesizer for selectively controlling an AC machine having at least two power phases by providing a controlled power waveform thereto of selected wave shape and frequency, said waveform synthesizer comprising:
- a waveform memory means divided into P addressable pages representing P available wave shapes with each page divided into S addressable segments, the segments of each page having binary switch control information stored therein, the pages and the segments of each page addressable through a memory address port to provide the so-addressed switch control information to switch control data lines;
- selectively gatable switch means connected between DC power source means to at least two output power nodes for connection to the AC machine to be controlled and connected to said switch control data lines;
- a stored-program-controlled processor means having an address output port connected to said memory address port for providing a page select address and having an address rate control port for providing an addressing rate select signal; and
- presettable frequency divider means connected to a source of input pulses having a selected repetition rate and connected to said waveform memory for addressing the segments of the addressed page, said frequency divider means providing output pulses at a selected divide-down ratio for addressing the segments of the addressed page at a rate determined by said output pulses;

said stored-program control means connected to said presettable frequency divider means for setting the divide ratio thereof, the frequency divider means addressing the segments of the addressed page at an addressing rate determined by the output pulses thereof to cause the gatable switch means to switch DC power to the output node to synthesize a waveform of selected wave shape in accordance with the stored binary switch control information of the addressed page and of selected frequency in accordance with the segment addressing rate; and analog-to-digital converter means connected to the DC power supply means and to said stored-program control means for providing a digital representation to said stored-program control means of a characteristic associated with the DC power.

14. The waveform synthesizer claimed in claims 11 or 12, wherein said stored-program control means further comprises:

a stored-program-controlled processor means having an address output port connected to said memory address port for providing a page select address and having an address rate control port for providing an addressing rate select signal; and a segment addressing means connected to said memory address port to sequentially address the segments of an addressed page at a selected addressing rate and connected to said address rate control port so as to provide a selected addressing rate in response to an addressing rate select signal provided from said processor means.

15. The waveform synthesizer claimed in claims 11, 12 or 13 wherein said stored-program control means includes an input port means for receiving waveform-determining information from an external device.

16. The waveform synthesizer claimed in claims 11, 12, or 13 wherein each page of said memory contains binary switching information for synthesizing the first half of a waveform and means for complementing the binary switching information for synthesizing the second half of a waveform.

17. The waveform synthesizer claimed in claims 11, 12, or 13, wherein said analog-to-digital converter means comprises a voltage-to-frequency converter.

* * * * *